US012102854B2

(12) United States Patent
Bausch et al.

(10) Patent No.: US 12,102,854 B2
(45) Date of Patent: Oct. 1, 2024

(54) AUTOMATED WILDFIRE DETECTION

(71) Applicant: UNIVERSITY OF HAWAII, Honolulu, HI (US)

(72) Inventors: Douglas Bausch, Makawao, HI (US); David Askov, Seattle, WA (US)

(73) Assignee: UNIVERSITY OF HAWAII, Honolulu, HI (US)

( * ) Notice: Subject to any disclaimer, the term of this patent is extended or adjusted under 35 U.S.C. 154(b) by 389 days.

(21) Appl. No.: 17/312,621

(22) PCT Filed: Dec. 18, 2019

(86) PCT No.: PCT/US2019/067118
§ 371 (c)(1),
(2) Date: Jun. 10, 2021

(87) PCT Pub. No.: WO2020/132031
PCT Pub. Date: Jun. 25, 2020

(65) Prior Publication Data

US 2022/0072350 A1 Mar. 10, 2022

Related U.S. Application Data

(60) Provisional application No. 62/783,497, filed on Dec. 21, 2018.

(51) Int. Cl.
*A62C 3/02* (2006.01)
*G08B 17/12* (2006.01)
(Continued)

(52) U.S. Cl.
CPC ............ *A62C 3/0271* (2013.01); *G08B 17/12* (2013.01); *G08B 21/10* (2013.01); *G08B 17/00* (2013.01)

(58) Field of Classification Search
CPC ...... A62C 3/0271; G08B 17/12; G08B 21/10; G08B 17/00
See application file for complete search history.

(56) References Cited

U.S. PATENT DOCUMENTS 8,565,484 B2 10/2013 Ko et al.
2019/0175965 A1* 6/2019 Huefner ............... A62C 3/0214
(Continued)

FOREIGN PATENT DOCUMENTS

| | | | |
|---|---|---|---|
| EP | 1275094 | B1 | 8/2004 |
| WO | WO 2013/030497 | A1 | 3/2013 |
| WO | 2014/179482 | A1 | 11/2014 |

OTHER PUBLICATIONS

Da Costa, The Use of Fire Radiative Power to Estimate the Biomass Consumption Coefficient for Temperate Grasslands in the Atlantic Forest Biome Revista Brasileira de Meteorologia, V. 32, Publication online 2017.

(Continued)

*Primary Examiner* — An T Nguyen
(74) *Attorney, Agent, or Firm* — BakerHostetler

(57) ABSTRACT

Systems and methods are described for the global, rapid, and automatic detection of wildfire activity. Such systems and methods may also classify wildfires based on a new severity classification scheme. Wildfire activity may be tracked as wildfires migrate, grow, and combine. Additionally, because satellite systems currently collect over 4 million fire observations per year, a filtering mechanism is introduced to remove benign anthropogenic fires. To classify wildfire severity for generating alerts, the present disclosure also provides a logarithmic severity classification system based on 24-hour cumulative Fire Radiative Power (FRP).

20 Claims, 13 Drawing Sheets

(51) Int. Cl.
*G08B 21/10* (2006.01)
*G08B 17/00* (2006.01)

(56) References Cited

U.S. PATENT DOCUMENTS

| | | | | |
|---|---|---|---|---|
| 2020/0159397 | A1* | 5/2020 | Tohidi | G06F 3/04847 |
| 2022/0016455 | A1* | 1/2022 | Tohidi | G06F 16/587 |

OTHER PUBLICATIONS

Wooster et al.; "Retrieval of biomass combustion rates and totals from fire radiative power observations: FRP derivation and calibration relationships between biomass consumption and fire radiative energy release"; Journal of Geophysical Research; vol. 110 D24311; 2005; 24 pages.
Sayre et al.; "A New Map of Global Ecological Land Units—An Ecophysiographic Stratification Approach"; AAG; @2014; 46 pages.
Vadrevu et al.; "Hotspot Analysis of Vegetation Fires and Intensity in the Region"; IEEE Journal of Selected Topics in Applied Earth Observations and Remote Sensing; vol. 6 No. 1; Feb. 2013; p. 224-238.
Schroeder et al.; "Integrated active fire retrievals and biomass burning emissions using complementary near-coincident ground, airborne and spaceborne sensor data"; Remote Sensing Environment; vol. 140; 2014; p. 719-730.
Beall et al.,; "Smoldering Fire Detection by Image-processing"; 12th International Conference On Automatic Fire Detection; Mar. 25-28, 2001; p. 71-78.

* cited by examiner

Hotspot overlap each other

Thick outline is merged fire boundary

AUTOMATED WILDFIRE DETECTION

CROSS-REFERENCE TO RELATED APPLICATIONS

This application is the National Stage Application of International Patent Application No. PCT/US2019/067118, filed Dec. 18, 2019 which claims the benefit of U.S. Provisional Application No. 62/783,497, filed on Dec. 21, 2018, entitled "Automated wildfire detection," the contents of which are hereby incorporated by reference in their entireties.

GOVERNMENT RIGHTS

This invention was made with government support under HQ0034-16-2-0001 awarded by the Department of Defense. The government has certain rights in the invention.

BACKGROUND

Weather observation organizations, such as the National Oceanic and Atmospheric Administration (NOAA) or the Pacific Disaster Center (PDC), monitor natural and man-made hazards around the globe. Wildfires are one such hazard. Wildfires continue to be a significant threat to humans, property, and the environment. In the year 2016 alone, a total of 5.5 million acres were reported to be burned by wildfires in the United Sates. Further, data indicates annual losses of tens of billions of dollars due to wildfires of various levels.

SUMMARY

Systems and methods are described for the global, rapid, and automatic detection of wildfire activity. In an example embodiment, a system may comprise one or more processors and memory coupled to at least one processor, wherein the memory comprises executable instructions that when executed by the at least one processor cause the at least one processor to effectuate operations described herein. The system may receive fire data regarding one or more fires. A location and severity of each fire may be determined. The system may compare the severity of each fire to a threshold severity. Based on the comparison, the system may determine one or more wildfires. The system may also issue one or more automated alerts to one or more computer reporting systems within the one or more geographic areas affected by the wildfires. The one or more automated alerts may be issued within a predetermined time after observing the hazard. In example embodiments, the predetermined time may be real time or near real time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
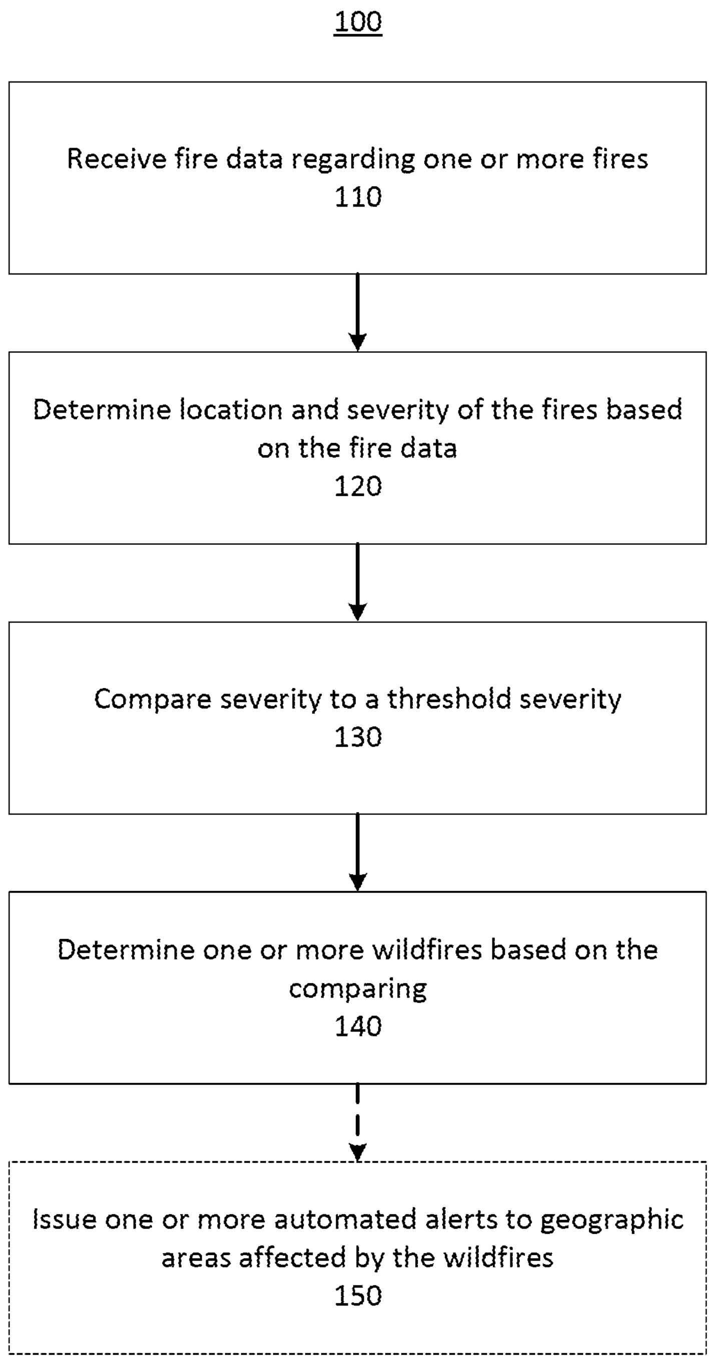
FIG. 1 is a flow diagram of an example method.

Hazard observation organizations, such as the National Oceanic and Atmospheric Administration (NOAA) or the Pacific Disaster Center (PDC), monitor natural and man-made hazards around the globe. Such organizations may use alert systems to issue hazard alert notifications and/or disaster alert notifications (collectively "alerts") to users within specific geographical areas impacted by the hazard or disaster. A wildfire is an example of such a hazard or disaster, which may cause widespread damage to life and property. Extensive efforts have been made in developing techniques to monitor, detect, and manage or mitigate wildfires.

Satellites have been used to monitor vast geographical areas in order to detect wildfires. Such satellites may typically be equipped with imaging devices configured to detect radiation (e.g., visible and/or thermal spectrum) corresponding to wildfires. Imaging data collected by the satellites may be relayed to ground station for processing to detect wildfires. While techniques have proven to be useful in detecting wildfires to take preventive measures, there are many drawbacks with existing technologies related to wildfire detection and tracking.

For example, due to the massive number of naturally occurring and man-made fires of varying degrees of size and intensity, disaster management facilities find it difficult to direct limited resources to manage wildfires. Satellites currently collect over 4 million fire observations per year, an average of over 12,000 per day. Because of this, large-scale wildfires may be lost among a number of fires of lesser destructive power. Existing technologies fail to reliably characterize and distinguish severe wildfires from less severe fires. Further, due to this inability to reliably differentiate among fires, there may be a large number of false positives of wildfire detection, resulting in wasted resources. Thus, there is a need for better logical filtering of observed fires and better detection and classification of wildfire activity.

Systems and methods are described for the global, rapid, and automatic detection of wildfire activity. Such systems and methods may also classify wildfires based on a new severity classification scheme. Wildfire activity may be tracked as wildfires migrate, grow, and combine. Additionally, because satellite systems currently collect over 4 million fire observations per year, a filtering mechanism is introduced to remove benign anthropogenic fires. To classify wildfire severity for generating alerts, the present disclosure also provides a logarithmic severity classification system based on 24-hour cumulative Fire Radiative Power (FRP).

In an example embodiment, a system may comprise one or more processors and memory coupled to at least one processor, wherein the memory comprises executable instructions that when executed by the at least one processor cause the at least one processor to effectuate operations described herein. The system may receive fire data regarding one or more fires. A location and severity of each fire may be determined. The system may compare the severity of each fire to a threshold severity. Based on the comparison, the system may determine one or more wildfires. The system may also issue one or more automated alerts to one or more computer reporting systems within the one or more geographic areas affected by the wildfires. The one or more automated alerts may be issued within a predetermined time after observing the hazard. In example embodiments, the predetermined time may be real time or near real time.

FIG. 1 is a flow diagram depicting an example method 100 for detecting one or more wildfires. Although FIG. 1 is depicted as a sequence of blocks, the depicted sequences should not be construed as limiting the scope of the present disclosure. In various cases, aspects, and embodiments, the blocks and described operations may be altered, omitted, reordered, or performed in parallel. The process of FIG. 1 may occur via the use of one or more processors in one or more computing entities.

At block 110, the method 100 may receive data regarding one or more fires. A fire may be observed via any suitable method. In some embodiments, fire data may be received via one or more satellite sources. In some embodiments, fire data may be received from one or more notification sources. For example, sensor and weather warning data may be received from a weather service or other hazard monitoring organization. In some embodiments, a fire may be user-defined. For example, a user may define that a fire has occurred or is occurring.

At block 120, a geographical location and severity of the observed fire(s) may be determined. Such attributes may be parsed from received data. Such attributes may also be received from one or more notification sources or may be user-defined. Alternatively or additionally, a user may define one or more of these attributes. Determination of location and severity may occur in any order.

At block 130, a severity of the observed fire(s) may be compared to a threshold severity. The threshold severity may be determined based on historical wildfire data. Alternatively or additionally, the threshold severity may be user-defined.

At block 140, based on the comparing, one or more of the observed fires may be classified as wildfires. For example, if a severity of an observed fire is greater than the threshold, that observed fire may be classified as a wildfire.

At block 150, one or more automated alerts may be issued to one or more geographic areas affected by, or that may be affected by, the wildfires. Such automated alerts may be of any suitable form and may be sent to one or more computer systems for distribution or reception. For example, automated alerts may be sent to mobile devices. Automated alerts may also be sent via a Common Alerting Protocol (CAP) or other standard protocol used by disaster alert systems.

Time may be an important factor in avoiding or preparing for dangerous and/or life-threatening wildfires. Systems for alerting users of such danger should be as fast as possible. The processes described with respect to FIG. 1 may be implemented in real time or near real time of observing a fire. Such fast processing ensures that users may be constantly receiving the latest updates regarding wildfires in their area.

Multiple wildfires may be handled simultaneously to provide alerts to some or all affected geographic areas. The processes described with respect to FIG. 1 may be performed in parallel to ensure affected geographic areas are issued alerts as soon as possible.

Figure 2:
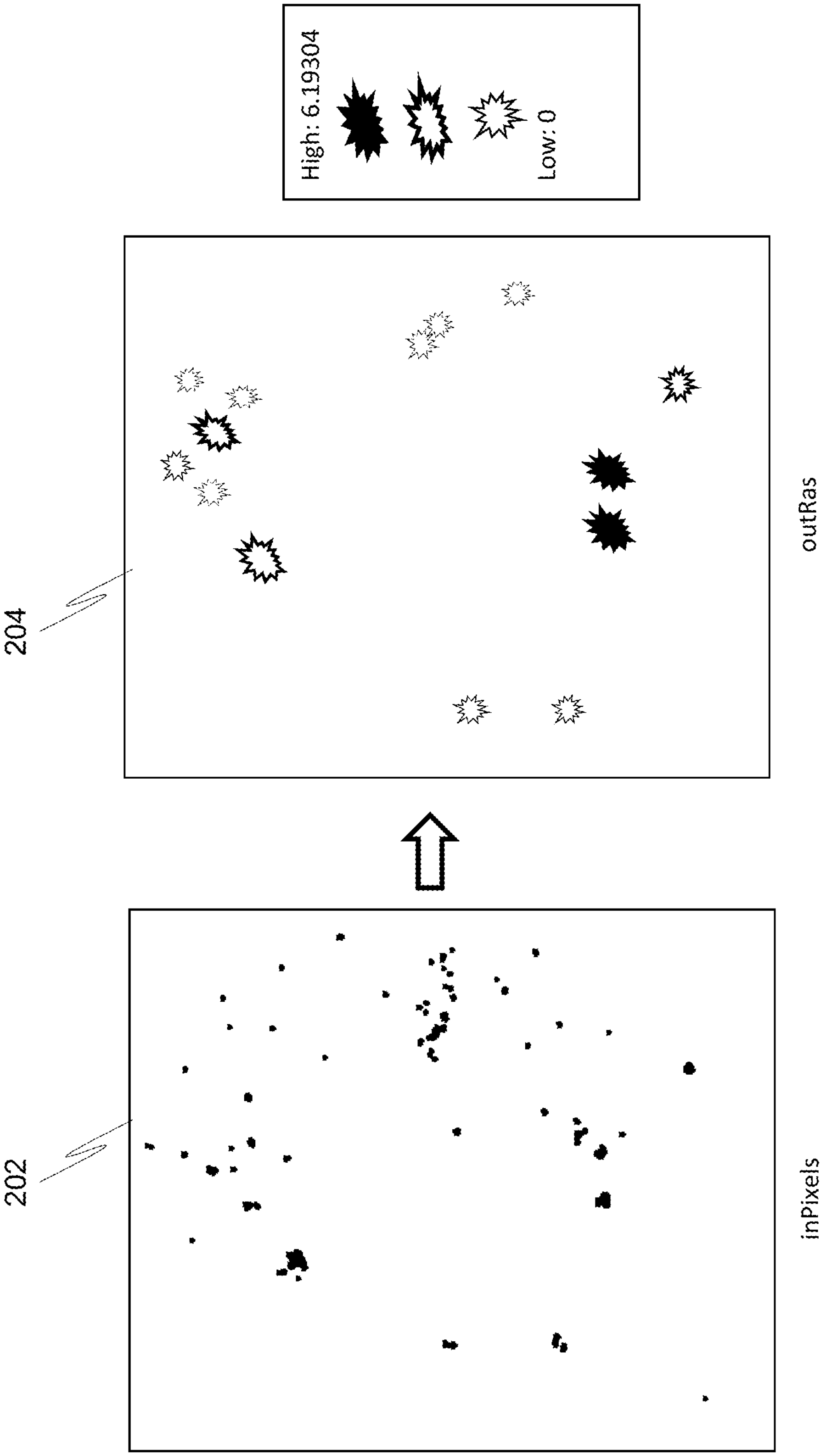
FIG. 2 shows an example density transformation to detect wildfires.

Fire data may be received or observed via any suitable method or source. For example, fire data may be received from the Land Atmosphere Near real-time Capability for EOS—Moderate Resolution Imaging Spectroradiometer (LANCE-MODIS) and/or the Fire Information for Resource Management System (FIRMS). The LANCE-MODIS and/or FIRMS systems may provide image data of geographic areas. Similarly, the Visible Infrared Imaging Radiometer Suite (VIIRS) sensor may provide image data of higher resolution than MODIS. Such image data may comprise "fire pixels" that may indicate the presence of one or more fires. Fire pixels may comprise pixels of received image data that are of a contrasting color to the rest of the image data. For example, image data without fires may comprise a solid background color, and fire pixels may comprise pixels of a different color. As shown in FIG. 2, fire pixels may comprise black pixels on a grey background. The image data may be analyzed to detect one or more wildfires. For example, clusters, or "hot spots", of fire pixels in the image data may indicate the presence of a wildfire. Additional processing may be performed on the image data to generate more-accurate predictions. For example, kernel density estimation (KDE) may be used with a fixed bandwidth to generate continuous fire intensity surfaces from detected fire pixels. Such estimation may be performed based on previously accumulated fire pixels, e.g., fire pixels observed during the previous 24-hour period.

LANCE-MODIS/FIRM data may be received manually or automatically. For example, a user may manually select to download such data. In another example, such data may be received automatically via a Dynamic Data Process and Publishing (D2P2) system based on one or more imaging schedules of one or more satellites.

Fire pixel data may be received as one or more shapefiles. A shapefile may comprise one or more of the following attributes for each fire pixel: a latitude and a longitude (e.g., a center of a 1 $km^2$ fire pixel, a corner of a 1 $km^2$ fire pixel, etc.), a brightness (e.g., MODIS channels 21/22 brightness temperature measured in Kelvin), a spatial resolution, an acquisition date and time, a type of satellite (e.g., Aqua or Terra), a brightness of channel 31 (e.g., channel 31 brightness temperature measured in Kelvin), a confidence (e.g., a quality determination of a fire pixel from 0-100%), and a Fire Radiative Power (FRP) measured in Megawatts (MW). It should be appreciated that the FRP may represent radiant heat liberated by the fire per unit time. Fire pixel data may optionally include a version for software compatibility purposes.

Received fire data may be filtered based on numerous criteria. For example, fire data may be filtered based on land use at a fire pixel's location. To exclude fire data points (e.g., fire pixels) that are likely associated with non-wildfires (i.e., benign anthropogenic) activity, including agricultural fires and urban sources, an image mask based on predetermined land-use classes may be used. Land-use classes may be known or determinable based on observed landmarks (natural or man-made) or other natural formations. Examples of excluded land-use classes may include, but are not limited to, water body, cropland, sparse vegetation, swamp or often flooded, artificial or urban area, bare area, snow and ice, and other similar classifications of land area not easily subject to wildfire. In addition, a dataset of static fire sources may be added to the image mask to exclude known sources of fires, such as volcanic activity, major oil and gas fields, as well as other static industrial activity. Accordingly, fire pixels corresponding to geographical areas identified with such excluded land-use classes or static fire sources may be excluded from further processing. Fire data points associated with other land-use classes, such as evergreen forest, deciduous forest, grassland, shrub or scrub, and other similar classifications of land area more easily subject to wildfire may be subjected to further processing. Such filtering based on land use classifications may greatly reduce the number of potential fires to process. For example, filtering performed on a one-year sample set of MODIS data from 2014 indicated over a 30% reduction in the number of classified fires.

Fire data may be processed to determine land areas where fire pixels are clustered or concentrated. Such land areas may be referred to as "hotspots." A Kernel Density Estimation (KDE) raster may be employed on fire image data to aid in determining hotspot locations. For example, an ArcGIS Kernel Density Estimation function may be used to identify where potential wildfire observations are concentrated. The resulting hotspot map may comprise a smoothed surface where one or more sections (or "cells") of the map may be assigned a density value. Density may be represented using a sliding scale, such as a gradient. The denser a cell of the map, the more likely a hotspot is located there.

A KDE may comprise at least five input parameters: output raster cell size; area unit scale; population field; search radius; and fire pixel attribute(s). KDE Output raster cell size and area unit scale may have a default value of 1,000 meters and "SQUARE KILOMETERS," respectively. Additionally or alternatively, raster cell size and area unit scale may comprise a same resolution and unit measurements as input data. The population field may add additional weight or severity to some features more heavily than others. For example, if an area is highly populated, then that area may be subject to more potential harm than an area less densely populated. The selection of a search radius (or "bandwidth") is influential because different bandwidths may produce very different visual patterns on the map. Maps created using a large bandwidth may appear more "smoothed" spatially over a large area and less blocky or pixelated, but may only generally locate fires. Maps created using a smaller search radius may appear blockier, but may locate potential fires in a better manner, and may provide a better ability to compare the automated wildfire hazards produced by the described systems and methods to actual fire reports, when available. In example testing, the preferred search radius that achieved the objective of accurately locating fires while minimizing the number of alerts for the various fire regimes by geographic region (i.e., Europe, North and South America, Asia and Australia, and Africa) was determined to be 50,000 ("50K") meters for all geographic areas. The fire pixel attribute(s) input may comprise one or more attributes of fire pixels by which to rank the input fire pixels. For example, fire pixels may be ranked by brightness, FRP, or both, which may result in different resultant images. In example testing, the use of FRP generated different results than that of the use of brightness temperature 31 ("T31"). The FRP model was biased toward pixels with radiance (i.e., hot, more powerful fires) resulting in fewer candidate hotspots, while the T31 model was more spatially distributed but produced more hotspots. FRP may result in a more reliable measure of fire severity than brightness. For example, agricultural fires are most often characterized as having a high brightness (T31) relative to FRP.

FIG. 2 illustrates an example KDE output raster. As shown, an image 202 comprises various fire pixels, shown as black pixel. The image 202 may have been received from LANCE-MODIS. The image 202 may be processed using a KDE function to generate an image 204 comprising a KDE output raster. The image 204 shows a generated raster, with the darker areas of the image 204 indicating higher density. In the example shown in FIG. 2, the KDE function used a cell size of 1,000 meters, a search radius of 50K meters, and FRP as the fire pixel attribute. While there are several clusters of fire pixels shown in the image 202, the severity of the fire pixels is taken into account with the KDE function (i.e., via the fire pixel attribute of FRP) such that the more severe fires are given greater weight/density and appear darker in the image 204. This is why, though there are clusters of fire pixels on the right side of the image 202, those clusters are not represented as large dark circles in the image 204.

A threshold severity may be determined based on historical data and may be used to better classify hotspots. Such a threshold severity may be determined by analyzing historical data. For example, a minimum, maximum, mean, and standard deviation of kernel density for each day of a previous year may be calculated for each geographic region represented in the input cells. A threshold severity may be selected that was unlikely to be exceeded on calendar days with little or no wildfire activity.

Figure 3:
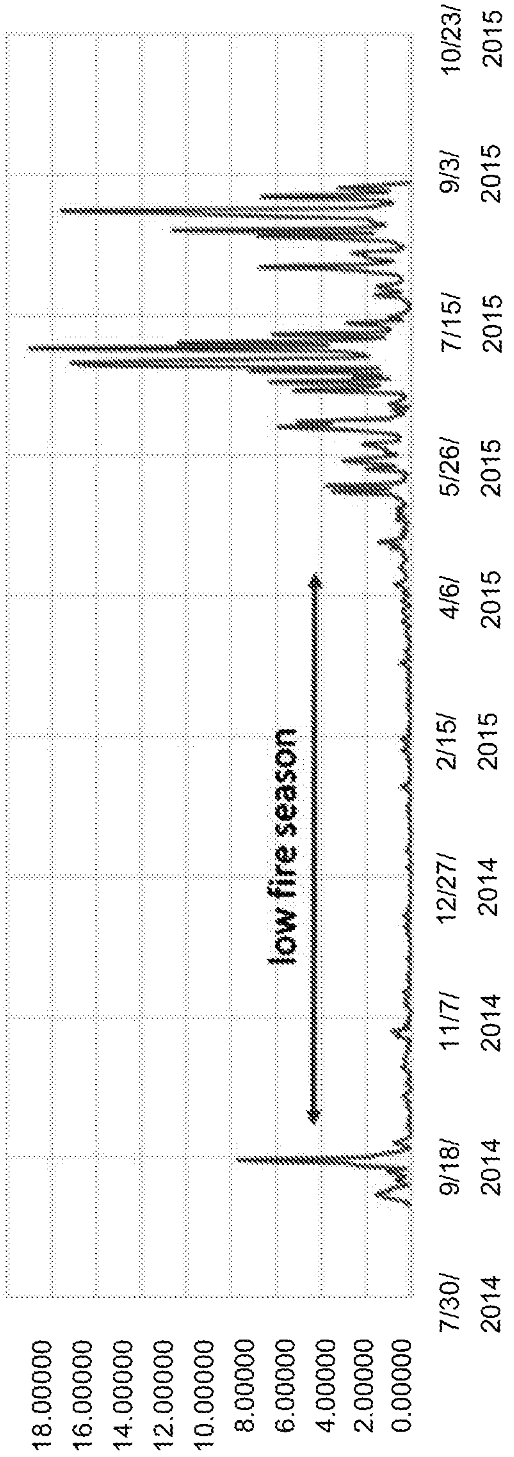
FIG. 3 is a diagram showing example wildfire activity throughout a calendar year.

Severity thresholds may vary by geographic region based on differences in fire regimes (i.e., Europe, North and South America, Asia and Australia, and Africa) and observations. For example, 2014 produced 2 million MODIS fire pixel observations in Africa, while only producing 10K fire pixel observations in Europe. A KDE severity threshold may represent density over the search radius on a per square kilometer basis. The KDE severity thresholds using FRP for density calculations were determined based on the daily max KDE for different geographical regions as follows: 0.05 Europe; 0.1 North and South America; 0.2 Asia and Australia; and 0.5 Africa. These initial severity thresholds were determined based on evaluating fire activity data corresponding to a year and set at a level based on the daily max KDE for low fire season days, as illustrated in FIG. 3. This allows some initial filtering of the minor activity, while producing a significant number of candidate fires throughout the fire season.

Assuming that hotspots/wildfire candidates are clustered in areas with higher density values, a spatial analysis tool may be used to separate out high density areas and convert them to polygons. For example, such a conversion process may be performed with ArcGIS Slice, Conditional, and Raster to Polygon functions.

Figure 4:
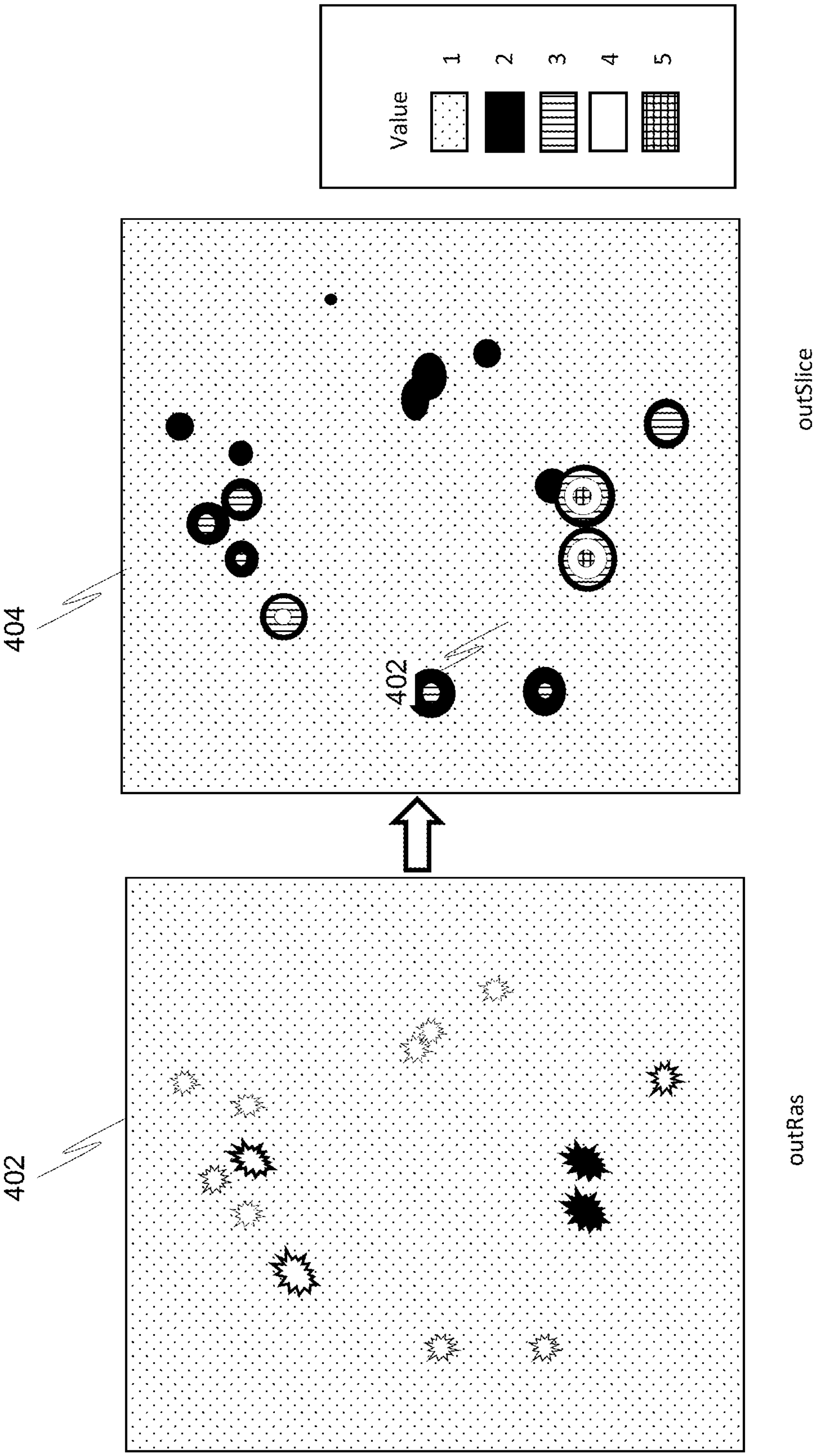
FIG. 4 shows an example image threshold analysis to detect wildfires.

The ArcGIS Slice function may be used to reclassify a range of input cells into potential hotspot polygons (i.e., candidate hotspots) based on an input threshold severity. A result of applying the ArcGIS Slice function is shown in FIG. 4. As shown, image 402 comprises the KDE output raster of image 204 of FIG. 2. The image 402 may be processed by the ArcGIS Slice function to generate an image 404 comprising several hotspot polygons. Note that the polygons may be color-coded based on severity. In FIG. 4, the polygons are delineated according to five levels of severity.

Figure 5:
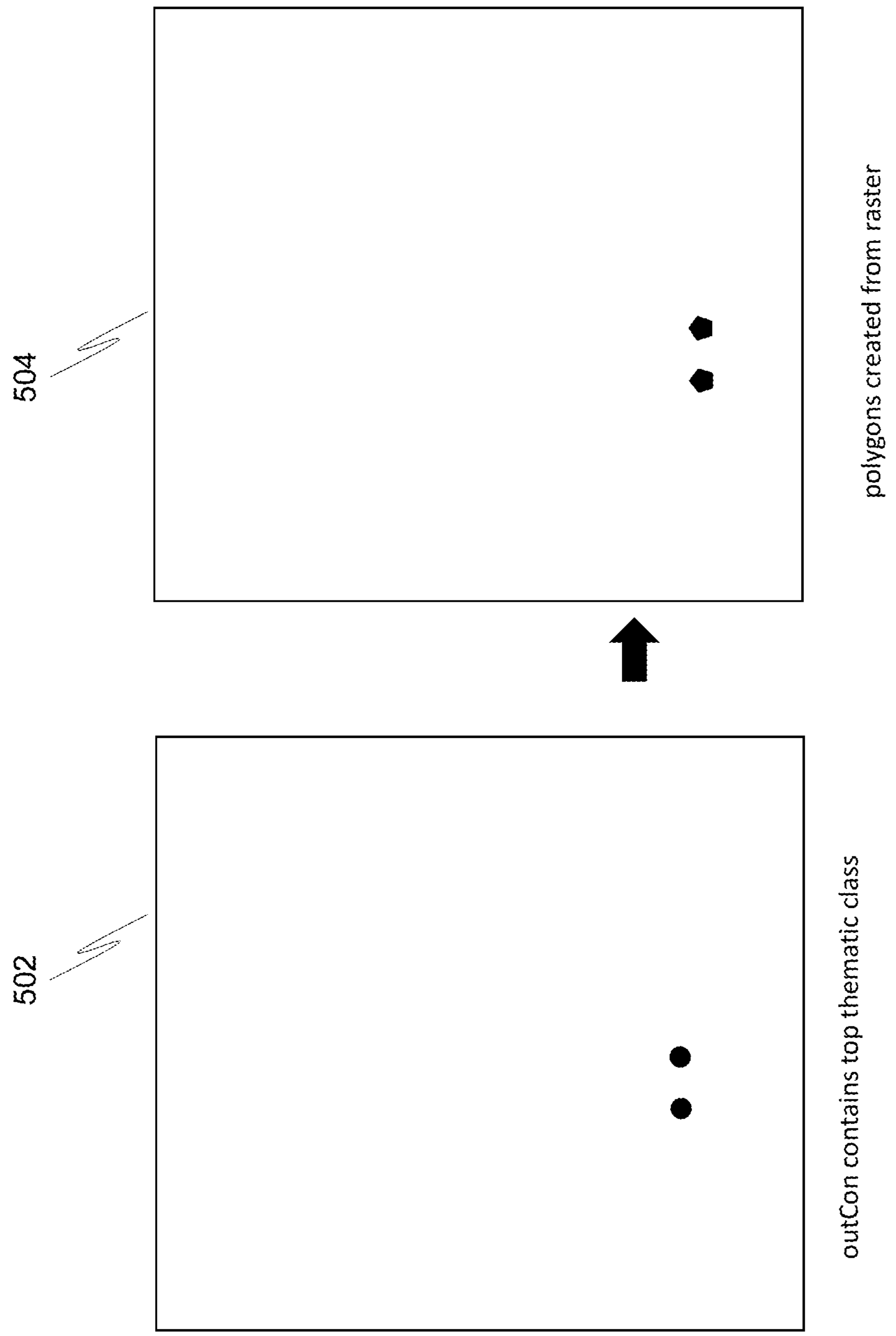
FIG. 5 shows an example image threshold determination to detect and locate wildfires.

Candidate hotspots may then be determined by the one or more areas of the image 404 output from the ArcGIS Slice function that exceed the threshold severity. The ArcGIS Conditional function may be used to perform a conditional if/else evaluation on each of the input cells in the raster. Any cell below or above a predetermined value, such as the threshold severity, may be set to either 0 or 1, respectively. Typically, only the cells having values of 1 may be retained for further processing; however, additional embodiments may continue to retain all or a subset of cells, such as cells having values of 0 surrounding the cells having values of 1. The raster dataset may then converted to polygon features. A result of applying the ArcGIS Conditional function is illustrated in FIG. 5. As shown, an image 502 comprises fire pixels most exceeding the threshold severity, as determined by the ArcGIS Slice function. The image 502 may be processed by the ArcGIS Conditional function to yield image 504 comprising two polygons.

Figure 6:
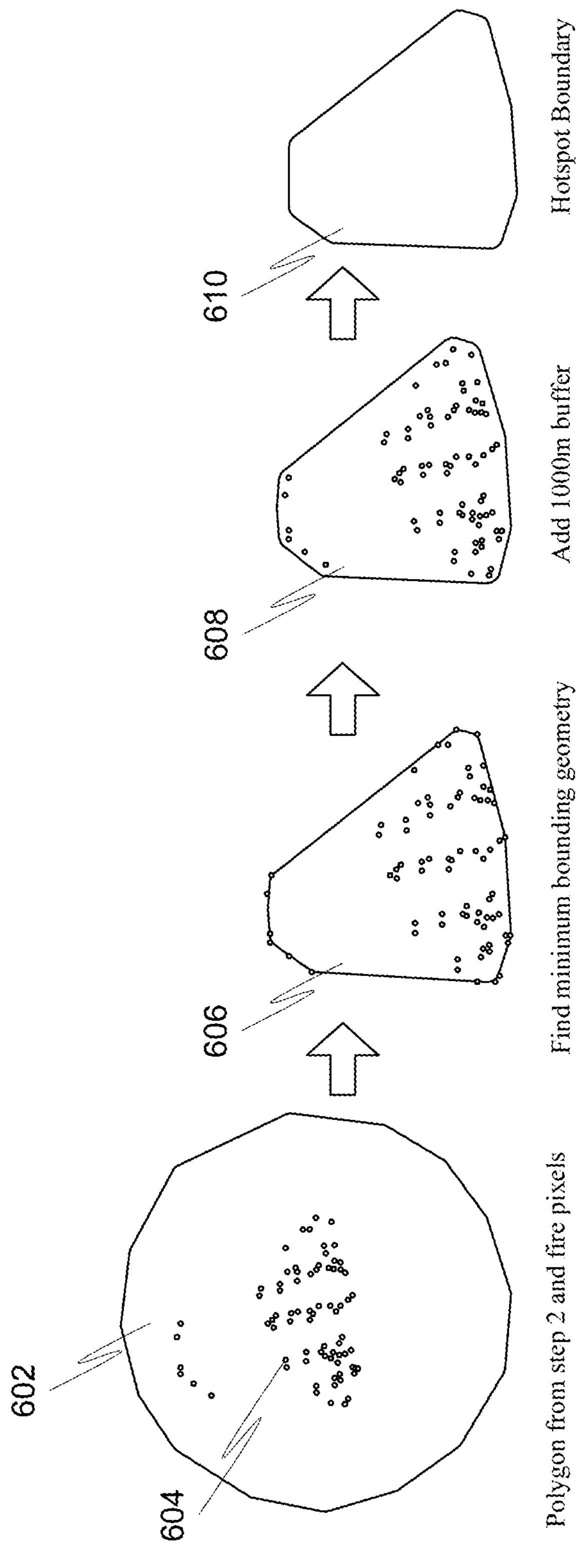
FIG. 6 shows an example method to determine a hotspot boundary.

Hotspots may be determined from polygons and fire pixels. Such hotspots may represent enclosing areas around fire pixels. The ArcGIS Minimum Bounding Geometry (ArcGIS MBG) function may be used to aid in determining the hotspots. The ArcGIS MBG may create a boundary comprising the outermost fire pixels. Additionally, a buffer distance of 1,000 meters may be added to each hotspot to expand the boundary. The process of creating such a hotspot boundary is illustrated in FIG. 6. Image 602 comprises the fire pixels 604, which may be processed using the ArcGIS MBG function to obtain a boundary 606 enclosing the fire pixels 604. Subsequently, a 1,000-meters buffer distance may be added to each fire pixel 604 to yield the boundary 608. Thereafter, the resulting boundary 610 may represent the hotspot boundary.

Fires may change over time. Thus, candidate hotspots and/or hotspot boundaries may be tracked over time. For example, fires may be tracked over the course of hours, days, weeks, etc. As fires progress over time, hotspot boundaries may expand. Expanding hotspots may begin to overlap with one another. Thus, overlapping hotspots may be aggregated into a single hotspot, which may then expand as the fire grows. The ArcGIS Aggregate Polygons functions may be used to perform such aggregation. Hotspot overlap may also be defined by a predetermined distance threshold if two or more hotspot boundaries do not occupy the exact same geographic area. For example, if portions of two hotspot boundaries are within 5,000 meters of one another, those portions may be joined to include the geographic area between those portions. Aggregating hotspots may allow better comparisons to previous and future hotspot boundaries and may prevent the creation of additional hazards as wildfire activity grows and merges. Hotspot boundaries may remain active for a predetermined amount of time (e.g., 48 hours), even if fires go undetected due to visibility issues such as potential smoke or cloud cover. Allowing hotspot boundaries to remain active may prevent the creation of new hazards in situations where such visibility issues arise.

Figure 7:
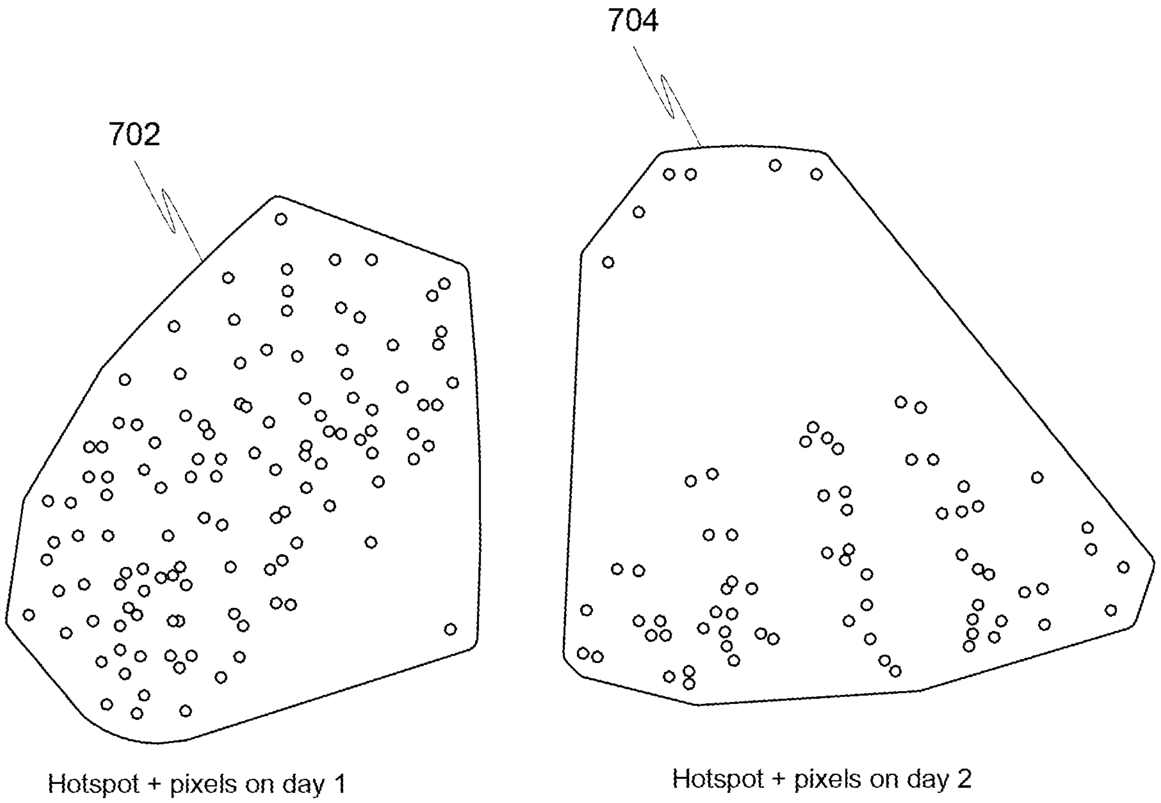
FIG. 7 shows an example hotspot boundary transformation.

FIG. 7 shows how a hotspot may change over time. The hotspot boundary 702 comprises a hotspot boundary on a first day. The hotspot boundary 702 may transform into the hotspot boundary 704 on a second day. Such transformation may be due to fire progression and/or migration.

Figure 8:
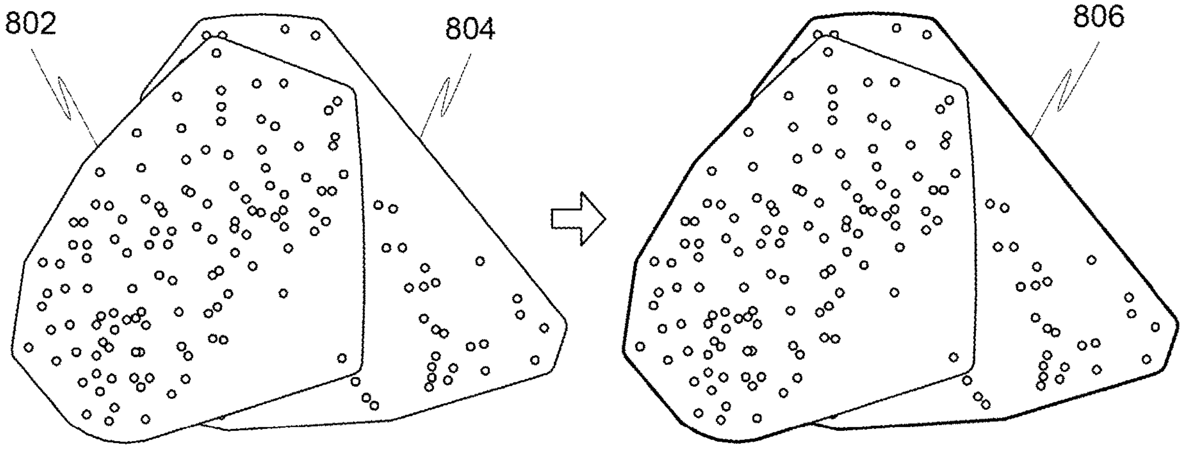
FIG. 8 shows an example method to merge hotspot boundaries.

FIG. 8 shows the hotspot boundaries of FIG. 7 being merged into a single hotspot. Hotspot boundary 802 corresponds to hotspot boundary 702 of FIG. 7, and hotspot boundary 804 corresponds to hotspot boundary 704 of FIG. 7. The hotspot boundaries 802 and 804 may be determined to overlap based on both hotspot boundaries 802 and 804 having geographic area in common. The hotspot 802 may be overlaid on the hotspot 804, or vice versa. A merged hotspot boundary 806, denoted by the heaviest weighted line, may be generated by determining the outermost reaches of both the hotspot 802 and the hotspot 804. Such determining may be performed via any suitable method of merging outermost polygon boundaries in the manner shown in FIG. 8.

One or more alerts may be issued, cancelled, or expired based on determining wildfires and tracking them over time. Issuance, cancellation, and expiration may be based on predetermined alert thresholds. On a periodic basis, potential fire pixel severity values may be summarized within hotspot polygons to estimate overall severity of a hotspot. The predetermined alert thresholds may be based on such overall severity. Fire Radiative Power (FRP) may represent the rate at which fuel is being consumed, and each fire pixel may have an associated FRP value in megawatts. Accordingly, use of FRP may imply that a physical property of a wildfire (e.g., power) is being considered, and aggregation of FRP values may provide an estimate of total power of a wildfire or hotspot. Further, the natural log of aggregated FRP may be calculated to normalize fire pixel data and reduce the impact of anomalously large fires when selecting alert thresholds. Each alert threshold (e.g., for issuance, cancellation, or expiration) may then correspond to a physical measure of the fire's power, as designated by the FRP.

In an example embodiment, fire data for a geographic region may be evaluated to identify wildfires that may be of concern to humans. Such evaluation may determine potential alert levels while attempting to reduce an overall number of alerts, as compared to other hazard alerts, such as those for earthquakes. For example, an evaluation of worldwide historic fire data from the years 2014-15 was classified based on the natural log of the cumulative FRP to determine potential hazard alerts. The evaluation indicated that 54 fires were classified with a hazard alert level of "Watch" (FRP threshold≥11), 124 fires were classified with a hazard alert level of "Advisory" (FRP threshold 10<11), and 372 fires were classified with a hazard alert level of "Information" (FRP threshold 9<10).

Additionally, "Warning" level alerts may typically be set manually. However, automated alert notifications may provide analysts with hazard alerts that may be upgraded, downgraded, or expired manually. For example, a wildfire with a hazard alert level of "Watch" may expire after 3 days, a wildfire with a hazard alert level of "Advisory" may expire after 2 days, and a wildfire with a hazard alert level of "Information" may expire after 1 day.

Figure 9:
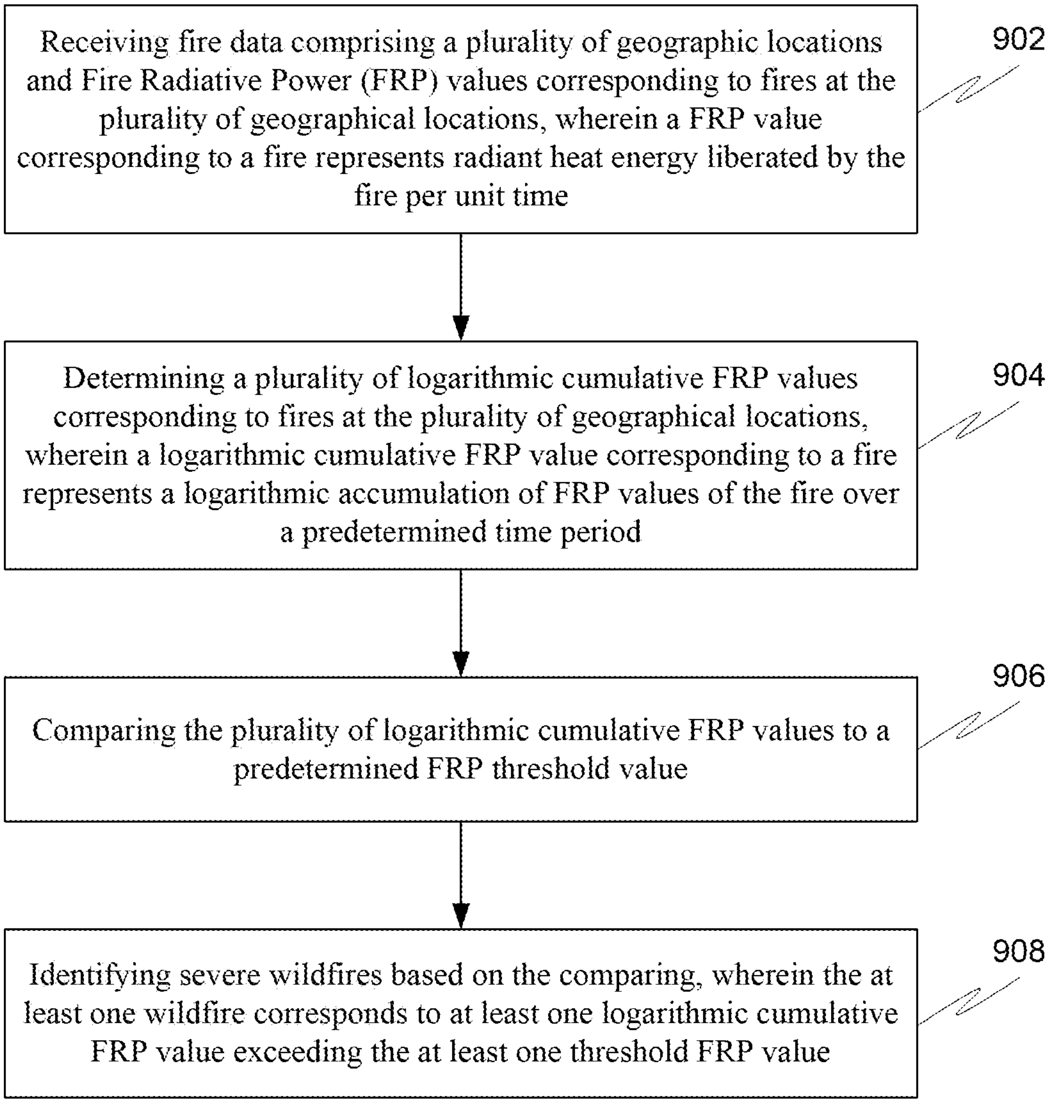
FIG. 9 is a flow diagram of an example method.

FIG. 9 is a flow diagram depicting an example method 900 for detecting one or more wildfires. Although FIG. 9 is depicted as a sequence of blocks, the depicted sequences should not be construed as limiting the scope of the present disclosure. In various cases, aspects, and embodiments, the blocks and described operations may be altered, omitted, reordered, or performed in parallel. The process of FIG. 9 may occur via the use of one or more processors in one or more computing entities.

At block 902, the method 900 may receive fire data comprising a plurality of geographic locations and Fire Radiative Power (FRP) values corresponding to fires at the plurality of geographical locations. Such fire data may be received from a device communicatively connected to the device performing the method 900. An FRP value corresponding to a fire may represent radiant heat energy liberated by the fire per unit of time.

At block 904, the method 900 may determine a plurality of logarithmic cumulative FRP values corresponding to fires at the plurality of geographical locations. A logarithmic cumulative FRP value corresponding to a fire may represent a logarithmic accumulation of FRP values of the fire over a predetermined time period.

At block 906, the method 900 may compare the plurality of logarithmic cumulative FRP values to at least one predetermined FRP threshold value.

At block 908, the method 900 may identify at least one wildfire based on the comparing. The at least one wildfire may correspond to at least one logarithmic cumulative FRP value exceeding the at least one threshold FRP value.

In some embodiments, the method 900 may further include excluding at least one geographical location from the plurality of geographical locations based on a land-use class associated with the at least one geographical location.

In some embodiments, the method 900 may further include excluding at least one geographical location from the plurality of geographical locations based on one or more predetermined fixed heat sources within the at least one geographical location.

In some embodiments, the at least one predetermined FRP threshold value may include a plurality of FRP threshold values associated with a plurality of geographical regions including the plurality of geographical locations.

In some embodiments, the at least one wildfire may include a plurality of wildfires. The method 900 may further include determining at least one hotspot boundary associated with at least one set of wildfires of the plurality of wildfires. The at least one hotspot boundary may include at least one minimum bounding geometry enclosing at least one set of geographical locations associated with the at least one set of wildfires.

In some embodiments, the method 900 may further include expanding a determined hotspot boundary based on a specified buffer distance.

In some embodiments, the method 900 may further include associating at least one hazard alert level with the at least one hotspot boundary. A hazard alert level associated with a hotspot boundary may be based on a frequency of at least one predetermined logarithmic cumulative FRP value associated with a set of wildfires enclosed by the hotspot boundary.

In some embodiments, the at least one hazard alert level may be further based on a proximity of the at least one hotspot boundary to a predetermined wildland urban interface (WUI) geographical area. A WUI may be defined as a geographic area where structures and other human development meet or intermingle with undeveloped wildland. These are especially dangerous areas for wildfires to occur since they immediately pose a potentially high risk of damage to homes and other structures, disruption to the local economy, or loss of life.

Figure 10:
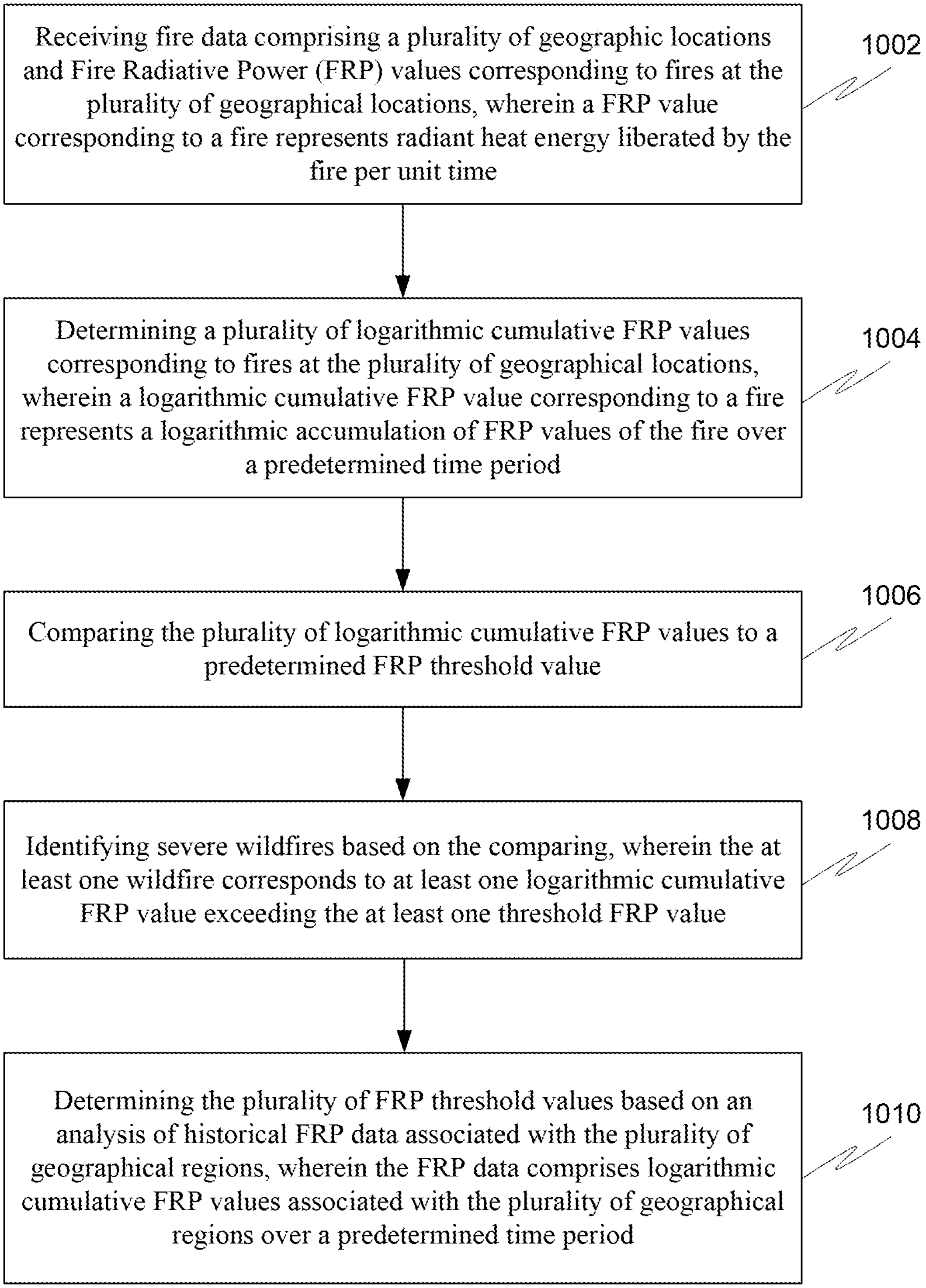
FIG. 10 is a flow diagram of an example method.

FIG. 10 is a flow diagram depicting an example method 1000 for detecting one or more wildfires. Although FIG. 10 is depicted as a sequence of blocks, the depicted sequences should not be construed as limiting the scope of the present disclosure. In various cases, aspects, and embodiments, the blocks and described operations may be altered, omitted, reordered, or performed in parallel. The process of FIG. 10 may occur via the use of one or more processors in one or more computing entities.

At block 1002, the method 1000 may receive fire data comprising a plurality of geographic locations and Fire Radiative Power (FRP) values corresponding to fires at the plurality of geographical locations. Such fire data may be received from a device communicatively connected to the device performing the method 1000. An FRP value corresponding to a fire may represent radiant heat energy liberated by the fire per unit time.

At block 1004, the method 1000 may determine a plurality of logarithmic cumulative FRP values corresponding to fires at the plurality of geographical locations. A logarithmic cumulative FRP value corresponding to a fire may represent a logarithmic accumulation of FRP values of the fire over a predetermined time period.

At block 1006, the method 1000 may compare the plurality of logarithmic cumulative FRP values to at least one predetermined FRP threshold value.

At block 1008, the method 1000 may identify at least one wildfire based on the comparing. The at least one wildfire may correspond to at least one logarithmic cumulative FRP value exceeding the at least one threshold FRP value.

At block 1010, the method 1000 may determine the plurality of FRP threshold values based on an analysis of historical FRP data associated with the plurality of geographical regions. The FRP data may include logarithmic cumulative FRP values associated with the plurality of geographical regions over a predetermined time period.

In some embodiments, the analysis of historical FRP data may include calculating one or more of a minimum, a maximum, a mean, and a standard deviation corresponding to a density of FRP values per unit area corresponding to each geographic region of the plurality of geographical regions.

Figure 11:
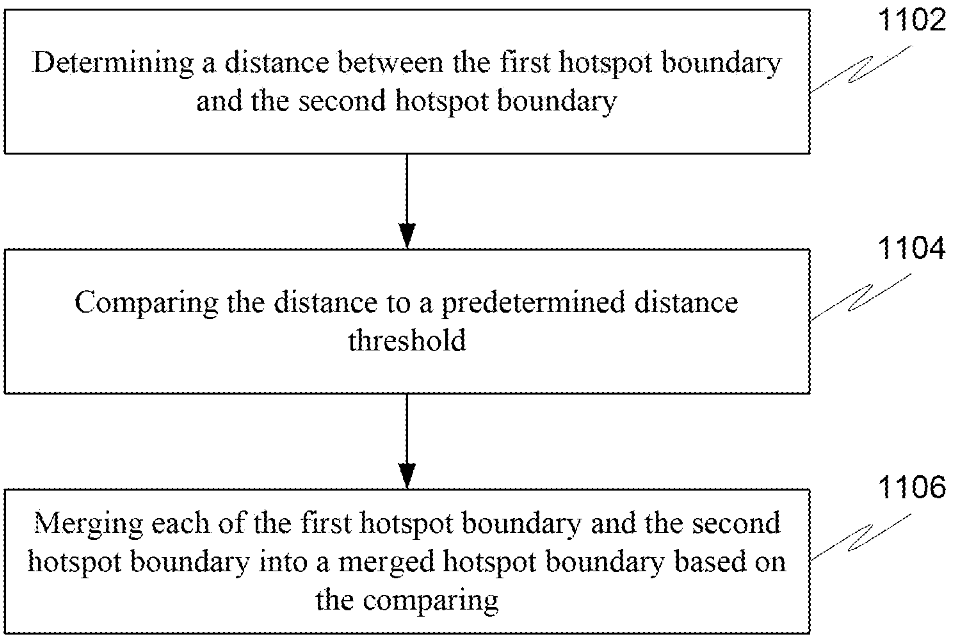
FIG. 11 is a flow diagram of an example method.

FIG. 11 is a flow diagram depicting an example method 1100 for tracking one or more wildfires. Although FIG. 11 is depicted as a sequence of blocks, the depicted sequences should not be construed as limiting the scope of the present disclosure. In various cases, aspects, and embodiments, the blocks and described operations may be altered, omitted, reordered, or performed in parallel. The process of FIG. 11 may occur via the use of one or more processors in one or more computing entities.

In some embodiments, a plurality of hotspots may be present, like those of FIGS. 7-8. The plurality of hotspots may include a first hotspot boundary and a second hotspot boundary. The first hotspot boundary may enclose a first set of geographical locations associated with a first set of wildfires identified over a first time period. The second hotspot boundary may enclose a second set of geographical locations associated with a second set of wildfires identified over a second time period.

At block 1102, the method 1100 may determine a distance between the first hotspot boundary and the second hotspot boundary.

At block 1104, the method 1100 may compare the distance to a predetermined distance threshold. For example, the first hotspot boundary and the second hotspot boundary may be within 5,000 meters of one another.

At block 1106, the method 1100 may merge each of the first hotspot boundary and the second hotspot boundary into a merged hotspot boundary based on the comparing. For example, FIG. 8 shows the merging of two hotspot boundaries.

Figure 12:
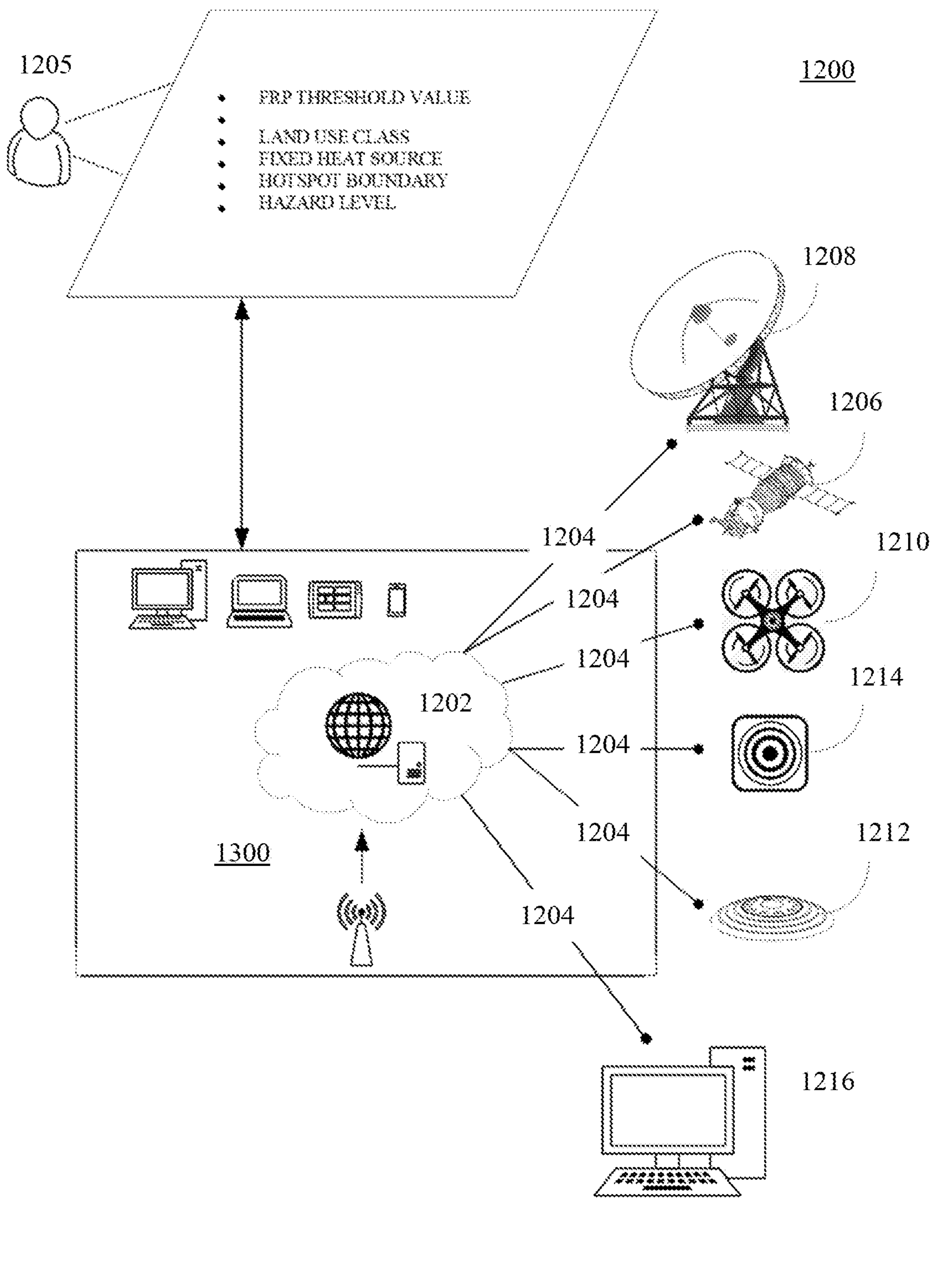
FIG. 12 is an example system.

FIG. 12 is an illustration of an online platform 1200 consistent with various embodiments of the present disclosure. By way of non-limiting example, the online platform 1200 for detecting wildfires may be hosted on a centralized server 1202, such as, for example, a cloud computing service. The centralized server 1202 may communicate with other network entities, such as, for example, the following: a satellite 1206 (e.g., MODIS); a ground station 1208 associated with the satellite 1206; one or more drones 1210 configured to capture physical variables (e.g., heat, radiation, smoke, sound, vibrations, etc.) associated with wildfires; a stationary fire detector 1212 (e.g., heat/radiation sensors installed in and around vegetation); a stationary sensor 1214 configured to capture physical variables associated with wildfires; and an administrative workstation 1216. The communication may take place over a communication network 1204, such as, but not limited to, the Internet.

Accordingly, in some embodiments, the online platform 1200 may be configured to receive and analyze data emanating from one or more network entities in order to detect a wildfire and in some instances, determine a severity of the wildfire. For example, the online platform 1200 may be configured to correlate variations in one or more physical variables associated with a geographical region (such as but not limited to, vibrations, temperature, smoke, air turbulences, etc.) sensed on the ground and/or by airborne sensors (e.g., drones 1210) with satellite data associated with the geographical region in order to enhance accuracy and/or reliability of detection a wildfire in the geographical region and in some instances, a severity of the wildfire.

Further, users of the platform may include for example, disaster management personnel, scientists, data analysts, and so on. Accordingly, electronic devices operated by such users may be in communication with the platform. For example, a user 1205, such as a disaster management personnel, may access platform 1200 through a software application. The software application may be embodied as, for example, but not be limited to, a website, a web application, a desktop application, and/or a mobile application compatible with a computing device 1300.

The user 1205 may access the platform in order to facilitate detection of wildfires. The user 1205 may accordingly provide one or more FRP threshold values, land-use classes corresponding to a geographical region, indications of fixed heat sources (e.g., volcanoes, industrial activities, etc.), indications of a hotspot boundary, indications of a hazard alert level associated with a wildfire, alerts, etc. Accordingly, the platform 1200 may be configured to detect wildfires by interacting with one or more components (such as those illustrated in FIG. 12). A user 1205 may use a user interface to interact with the platform 1200. A user interface may be any suitable interface for allowing the user to interact with the system. Examples of user interfaces include graphical user interfaces (GUIs) and command-line interfaces.

The platform 1200 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 1200 may be hosted on a centralized server, such as, for example, a cloud computing service. Although the methods described herein have been described to be performed by a computing device, 1300, it should be understood that, in some embodiments, different operations may be performed by different networked elements in operative communication with computing device 1300.

Figure 13:
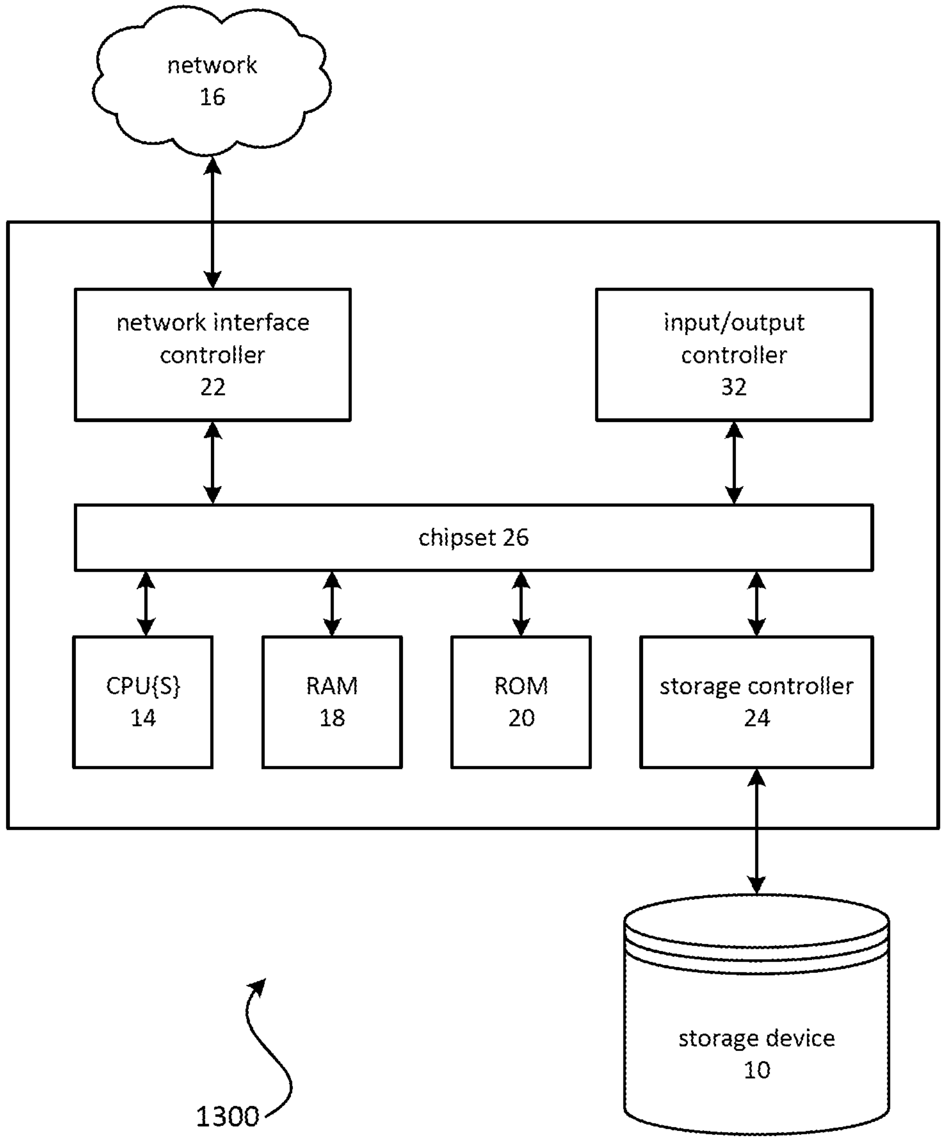
FIG. 13 depicts an example computing system.

FIG. 13 depicts a computing device that may be used in various system components, such as any of those described and/or depicted with regard to FIGS. 1-12. The computer architecture shown in FIG. 13 may correspond to a desktop computer, laptop, tablet, network appliance, e-reader, smartphone, or other computing device, and may be utilized to execute any aspects of the computers described herein, such as to implement the operating procedures of FIGS. 1-12.

A computing device 1300 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 1300.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 1300. The chipset 26 may further provide an interface to a computer-readable storage medium, such as a read-only memory ("ROM") 20 or non-volatile RAM ("NVRAM") (not shown), for storing basic routines that may help to start up the computing device 1300 and to transfer information between the various components and devices. The ROM 20 or NVRAM may also store other software components necessary for the operation of the computing device 1300 in accordance with the aspects described herein.

The computing device 1300 may operate in a networked environment using logical connections to remote computing nodes and computer systems through a local area network ("LAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 1300, connecting the computing device to other types of networks and remote computer systems.

The computing device 1300 may be connected to a mass storage device 10 that provides non-volatile storage for the computing device 1300. The mass storage device 10 may store system programs, application programs, other program modules, and data, used to implement the processes and systems described in greater detail herein. The mass storage device 10 may be connected to computing device 1300 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1300 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 1300 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 10 by detecting the physical states or characteristics of one or more particular locations within the physical storage units.

In addition to the mass storage device 10 described above, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 1300. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 1300.

The mass storage device 10 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 14 transition between states, as described above. The computing device 1300 may have access to computer-readable storage media storing computer-executable instructions, which, when executed by the computing device 1300, may perform operating procedures depicted in FIGS. 1-12.

The computing device 1300 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing node may be a physical computing device, such as the computing device 1300 of FIG. 13. A computing node may also include a virtual machine host process and one or more virtual machine instances operating on a physical computing device, such as the computing device 1300. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method of detecting wildfire activity at a geographical location, the method comprising:
 receiving fire data comprising a plurality of geographical locations and Fire Radiative Power (FRP) values corresponding to fires at the plurality of geographical locations, wherein an FRP value corresponding to a fire represents radiant heat energy liberated by the fire per unit time;
 determining a plurality of logarithmic cumulative FRP values corresponding to the fires at the plurality of geographical locations, wherein a logarithmic cumulative FRP value corresponding to a fire represents a logarithmic accumulation of FRP values of the fire over a predetermined time period;
 comparing the plurality of logarithmic cumulative FRP values to at least one predetermined FRP threshold value; and
 identifying at least one wildfire based on the comparing, wherein the at least one wildfire corresponds to at least one logarithmic cumulative FRP value exceeding the at least one predetermined threshold FRP value.

2. The method of claim 1, further comprising excluding at least one geographical location from the plurality of geographical locations based on a land-use class associated with the at least one geographical location.

3. The method of claim 1, further comprising excluding at least one geographical location from the plurality of geographical locations based on one or more pre-determined fixed heat sources with the at least one geographical location.

4. The method of claim 1, wherein the at least one predetermined FRP threshold value comprises a plurality of FRP threshold values associated with a plurality of geographical regions comprising the plurality of geographical locations.

5. The method of claim 4, further comprising determining the plurality of FRP threshold values based on an analysis of historical FRP data associated with the plurality of geographical regions, wherein the FRP data comprises logarithmic cumulative FRP values associated with the plurality of geographical regions over a predetermined time period.

6. The method of claim 5, wherein the analysis of historical FRP data comprises calculating at least one of a minimum, a maximum, a mean, and a standard deviation corresponding to a density of FRP values per unit area corresponding to each geographic region of the plurality of geographical regions.

7. The method of claim 1, wherein the at least one wildfire comprises a plurality of wildfires, wherein the method further comprises determining at least one hotspot boundary associated with at least one set of wildfires of the plurality of wildfires, wherein at least one hotspot boundary comprises at least one minimum bounding geometry enclosing at least one set of geographical locations associated with at least one set of wildfires.

8. The method of claim 7, further expanding a determined hotspot boundary based on a specified buffer distance.

9. The method of claim 7, wherein the at least one hotspot boundary comprises a first hotspot boundary and a second hotspot boundary, wherein the first hotspot boundary encloses a first set of geographical locations associated with a first set of wildfires identified over a first time period, wherein the second hotspot boundary encloses a second set of geographical locations associated with a second set of wildfires identified over a second time period, the method further comprising:
 determining a distance between the first hotspot boundary and the second hotspot boundary;
 comparing the distance to a predetermined distance threshold; and
 merging each of the first hotspot boundary and the second hotspot boundary into a merged hotspot boundary based on the comparing.

10. The method of claim 7, further comprising associating at least one hazard alert level with the at least one hotspot boundary, wherein a hazard alert level associated with a hotspot boundary is based on a frequency of at least one predetermined logarithmic cumulative FRP value associated with a set of wildfires enclosed by the hotspot boundary.

11. The method of claim 10, wherein the at least one hazard alert level is further based on a proximity of the at least one hotspot boundary to a predetermined wildland-urban interface geographical area.

12. A system for detecting wildfire activity at a geographical location, the system comprising:
 a communication device configured for receiving fire data, the fire data comprising a plurality of geographic locations and Fire Radiative Power (FRP) values corresponding to fires at the plurality of geographical locations, wherein an FRP value corresponding to a fire represents radiant heat energy liberated by the fire per unit time; and
 a processing device configured for:
  determining a plurality of logarithmic cumulative FRP values corresponding to fires at the plurality of geographical locations, wherein a logarithmic cumulative FRP value corresponding to a fire represents a logarithmic accumulation of FRP values of the fire over a predetermined time period;
  comparing the plurality of logarithmic cumulative FRP values to at least one predetermined FRP threshold value; and
  identifying at least one wildfire based on the comparing, wherein the at least one wildfire corresponds to at least one logarithmic cumulative FRP value exceeding the at least one predetermined threshold FRP value.

13. The system of claim 12, wherein the processing device is further configured for excluding at least one geographical location from the plurality of geographical locations based on land-use class associated with the at least one geographical location.

14. The system of claim 12, wherein the processing device is further configured for excluding at least one geographical location from the plurality of geographical locations based on pre-determined fixed heat sources with the at least one geographical location.

15. The system of claim 12, wherein the at least one predetermined FRP threshold value comprises a plurality of FRP threshold values associated with a plurality of geographical regions comprising the plurality of geographical locations.

16. The system of claim 15, wherein the processing device is further configured for determining the plurality of FRP threshold values based on an analysis of historical FRP data associated with the plurality of geographical regions, wherein the FRP data comprises logarithmic cumulative FRP values associated with the plurality of geographical regions over a predetermined time period.

17. The system of claim 16, wherein the analysis comprises calculating at least one of a minimum, a maximum, a mean and a standard deviation corresponding to a density of FRP values per unit area corresponding to each geographic region of the plurality of geographical regions.

18. The system of claim 12, wherein the at least one wildfire comprises a plurality of wildfires, wherein the system further comprises determining at least one hotspot boundary associated with at least one set of wildfires of the plurality of wildfires, wherein the at least one hotspot boundary comprises at least one minimum bounding geometry enclosing at least one set of geographical locations associated with the at least one set of wildfires.

19. The system of claim 18, wherein the processing device is further configured for expanding the hotspot boundary on at least one portion of the hotspot boundary based on a specified buffer distance.

20. The system of claim 18, wherein the at least one hotspot boundary comprises a first hotspot boundary and a second hotspot boundary, wherein the first hotspot boundary encloses a first set of geographical locations associated with a first set of wildfires identified over a first time period, wherein the second hotspot boundary encloses a second set of geographical locations associated with a second set of wildfires identified over a second time period, wherein the processing device is further configured for:

determining a distance between the first hotspot boundary and the second hotspot boundary;

comparing the distance to a predetermined distance threshold; and merging each of the first hotspot boundary and the second hotspot boundary into a merged hotspot boundary based on the comparing.

* * * * *